Patented Aug. 25, 1953

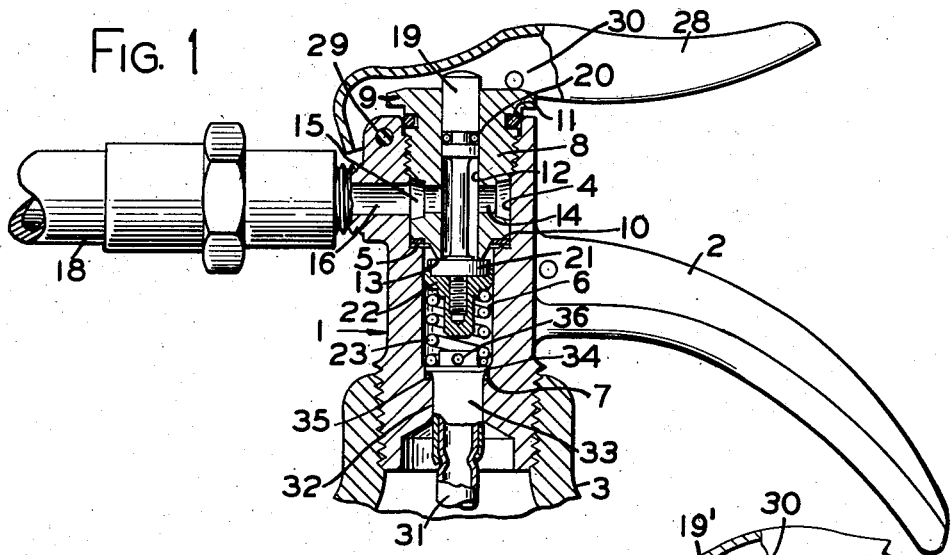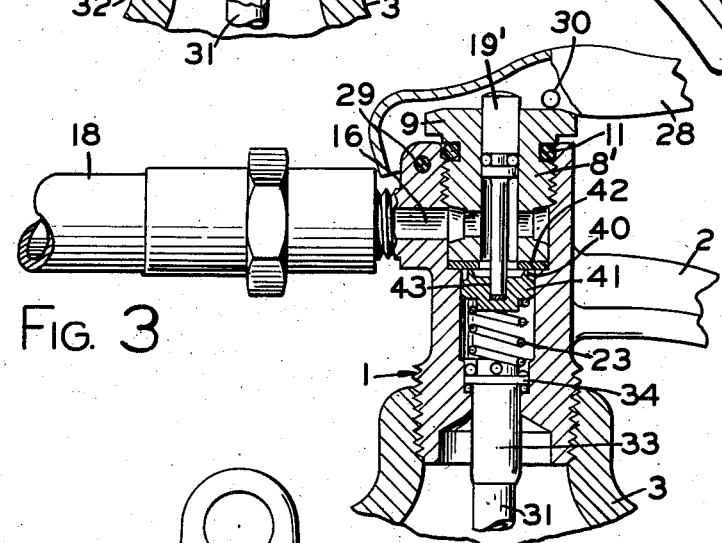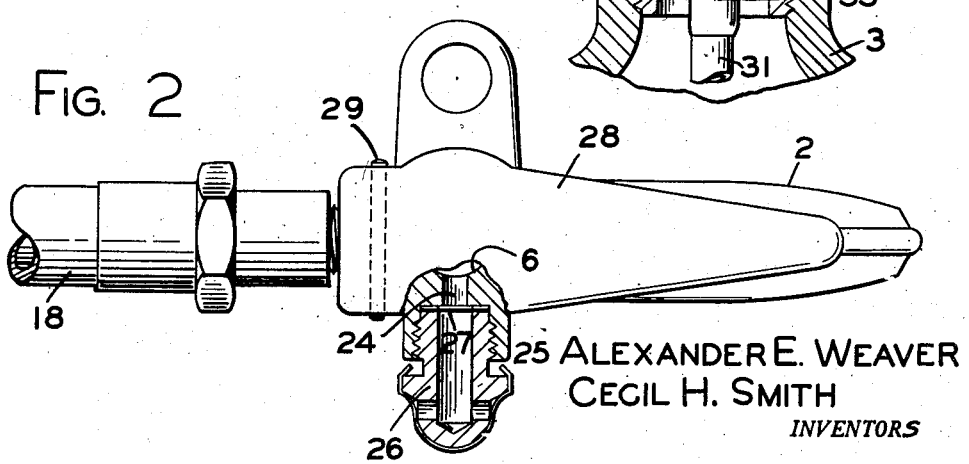

2,649,919

UNITED STATES PATENT OFFICE 2,649,919

FIRE EXTINGUISHER DISCHARGE HEAD

Alexander E. Weaver and Cecil H. Smith, Elmira, N. Y., assignors to American-La France-Foamite Corporation, Elmira, N. Y., a corporation of New York Application March 7, 1951, Serial No. 214,361

4 Claims. (Cl. 169—31)

1

This invention relates to discharge heads for fire extinguishers and, more particularly, to a valved type of head appropriate, for example, to control the discharge of a carbon dioxide extinguisher.

The general object of the invention is to provide an improved discharge head which is both effective in use and economical to manufacture and which, in addition, can be maintained with a minimum of effort and expense. In the latter connection, the preferred embodiment of the invention is so organized as to permit the ready inspection and replacement of vital parts without removal of the head from its cylinder.

The invention will be understood from the following description of the preferred embodiment illustrated in the drawings, in which:

Fig. 1 is a central vertical section of the head and upper end of its cylinder;

Fig. 2 is a broken-out top plan view of the head; and

Fig. 3 is a broken-out sectional view of a portion of the head of Fig. 1 but showing an alternative valve member construction.

In this preferred form of head, the entire body portion 1 lends itself to fabrication as a single forging and, if desired, the carrying handle 2 can be included as an integral part of the body. The body is adapted for connection directly to a fluid medium container and for that purpose is shown threaded at its lower end for connection to the neck threads of an extinguisher cylinder 3. In line with common practice, these threads are preferably tapered iron pipe threads, so that the head may be turned up tight into the cylinder.

The body 1 has a through bore shown as and preferred to be disposed vertically, which bore incorporates what will be referred to for convenience as a plug section and a valve chamber section. The plug section, which is shown as a large counterbore 4 open at the upper end of the head, terminates at its lower end in a shoulder 5. The valve chamber section, shown as a continuing counterbore 6 of smaller diameter, terminates at its lower end in a shoulder 7.

A threaded plug 8, having a nut head portion 9 overlying the upper end of the valve body, occupies the plug section of the through bore in the head, the plug being turned home tight against a sealing washer 10 seated on shoulder 5. A sealing ring 11 surrounds the plug adjacent its upper end. The plug in turn has a vertical through bore 12, the entrance to this bore at the lower end of the plug being surrounded by a valve seat

2

13 formed integrally with the plug and thus facing and projecting slightly into the valve chamber section of the head bore. The lower portion of the plug bore forms part of the discharge outlet passage of the extinguisher, the exit from the plug bore comprising a lateral, intersecting bore 14 which opens into an annular plug recess 15. Vertically aligned with the plug recess is an outlet passage 16 in the body 1 opening to the exterior through the head boss adapted for connection to a suitable discharge tube, such as hose 18.

It will be seen not only that the entire body portion may be formed as a single forging and that only the simplest of boring and threading operations are required to complete it but also that the head can be completely disassembled by removing the plug 8. The valve seat being formed as part of the plug, it (as well as the other valve components) can be inspected and repaired or replaced, as may be necessary, without removing the head from the cylinder. This latter advantage is important, particularly with extinguishers which have been in use for a considerable period. In connection with the head structures in common use, which do require removal, it is found that after the pipe thread joint between the head and the cylinder has once been broken, thread leakage is frequently encountered when the head is replaced.

The plug bore also accommodates a valve stem or plunger 19, the upper end of which projects above the top of the plug. The upper end portion of the plunger is a sliding fit in the plug bore, the escape of the fluid medium through the upper end of the bore being precluded by a sealing ring 20. From a point somewhat above lateral bore 14, the lower part of the plunger is of reduced diameter to establish a surrounding discharge passage of adequate size; and at its lower end the plunger is arranged to actuate a discharge valve. In this preferred form the valve comprises a centrally apertured, non-metallic disc 21 carried by a cup member 22 threaded directly onto the lower end of the valve plunger. The valve disc is held against the valve seat by spring 23 which at its upper end engages the underside of cup member 22 and which at its lower end is sustained by shoulder 7.

As shown in Fig. 2, a lateral bore 24 leads from the valve chamber to the counterbored boss 25 in which is mounted any suitable form of safety plug 26 and rupturable disc 27 as commonly used with high pressure extinguishers.

The opening of the valve by depressing plunger 19 may be controlled by an actuator lever 28.

This lever, which is pivoted to the body 1 at 29, overlies the upper end of the valve plunger and extends above handle 2 for convenient squeeze-grip operation. A removable pin may be inserted in hole 30 to lock the actuator lever against inadvertent operation.

When the head is applied to a carbon dioxide or similar type extinguisher, a siphon tube 31 is suitably attached to the lower end of body 1. The common method of attachment is by threading the top end of the tube and the adjacent section of the head bore; but in the illustrated siphon tube mounting arrangement, which is the subject of a copending application, such threading is dispensed with. The tube is formed with an enlargement, such as a flange, at its upper end and is suspended from and clamped to the head by means of such enlargement or flange. Furthermore, in this preferred form, the tube is arranged to be removable without requiring the removal of the head. In this latter connection it may be mentioned that carbon dioxide extinguisher cylinders are required to be hydrostatically tested after a certain period of use and, of course, after such testing, the water is required to be removed from the cylinder. To empty the cylinder it has heretofore been necessary to remove the entire head, with its attached siphon tube but, as mentioned above, this operation is often followed by thread leakage difficulties.

In the illustrated construction, the siphon tube is inserted downwardly, and is removable upwardly, through the head bore, instead of being attached by the usual method of threading upwardly into the lower end of the head. The enlargement by which the tube is suspended in the reduced diameter siphon tube section 32 of the head bore may consist of a flanged collar 33 suitably attached to the upper end of the siphon tube, as by crimping, soldering or any other convenient method. The collar flange 34 is of a diameter to pass down through the head bore until it engages and seats on the shoulder 7. A non-metallic washer 35 is shown applied to the collar just beneath its flange. The suspended tube is suitably clamped to the head for ready removal. In this instance, the tube clamping elements comprise the plug, valve member and valve spring, the latter, as shown, seating on the upper side of the collar flange. To insure ready removal of the siphon tube, even against any tendency to stick, coupling means for a suitable lifting tool may be provided. For instance, as shown, the upper end of the tube or of the collar 33 may be cross-drilled to form holes 36 to receive a lifting hook. It will thus be seen that the siphon tube can be withdrawn, without disturbing the head-cylinder joint, upon removal of the plug, valve member and spring.

In the form of the invention illustrated in Fig. 3, the locations of the seat portion and the non-metallic sealing portion which are engaged when the valve is closed are, in effect, reversed. That is to say, the annular valve seat projection 40 (which corresponds to the valve seat portion 13 of the Fig. 1 form) is formed, not on the lower end of the plug member 8', but on the upper face of the valve member 41. And the washer or non-metallic sealing element 42, which is clamped in position by the plug member (as before) is enlarged so as to be engaged by the seat portion 40. Thus, the washer 42 serves not only to seal the lower end of the plug member in the head bore but also as the sealing member against which the valve seat bears. Also, in this form of the invention, the valve member 41 is shown provided with a center hole or depression 43 in which the lower end of the stem 19' seats. In all other respects, the construction may be as already described and, for that reason, corresponding parts are identified by the same reference characters as in Fig. 1.

It will be understood that the foregoing detailed description is applicable only to the preferred structure illustrated and that the principles exemplified may be embodied in various forms without departing from the spirit of the invention.

The following is claimed:

1. A fire extinguisher discharge head comprising a body having a laterally extending handle, the body having a vertical through bore and being exteriorly threaded at its lower end for connection to a fluid medium container; said bore incorporating upper and lower counter-bore sections terminating at their lower ends in upper and lower upwardly facing shoulders, respectively; a plug member having threaded engagement with the upper counter-bore section and, at its lower end, terminating at and seating on the upper shoulder; said plug member having a vertical through bore; a valve member in the lower counter-bore section engaged with the lower end of the plug member; a spring in the lower counter-bore section extending between the lower counter-bore shoulder and the back of the valve member and biasing the same toward the lower end of the plug member; one of said members having a projecting annular seat portion; said plug member having an outlet bore extending laterally from its vertical bore and the head having an outlet communicating with the plug member outlet bore; a valve plunger reciprocable in the plug member bore, said plunger extending above the top of the plug member and being of less diameter than the plug member bore from its lower end to a point above the plug member outlet bore; and an actuator lever pivotally mounted on the head on the side remote from the handle and overlying the handle and the upper end of the valve plunger.

2. A fire extinguisher discharge head adapted for connection to a fluid medium container, comprising: a body portion incorporating a valve chamber, an inlet thereto at one side of the chamber and a plug bore communicating with another side of the chamber; a removable plug in said bore, the inner end of the plug forming a valve chamber closure; said plug incorporating an outlet passage having an entrance thereto in said inner end of the plug; a sealing member engaged with said inner end of the plug and surrounding said entrance; a valve member in the valve chamber having a seat portion adapted for engagement with said sealing member; and a valve closing spring in said valve chamber.

3. A fire extinguisher discharge head adapted for connection to a fluid medium container, comprising: a body portion incorporating a valve chamber, an inlet thereto at one end of the chamber and a plug bore communicating with the opposite end of the chamber; a removable plug in said bore, the inner end of the plug forming a valve chamber closure; said plug incorporating an outlet passage having an entrance thereto in said inner end of the plug and an exit from the passage through one side of the plug; the head having an outlet passage in communication with said exit; a sealing member surrounding said entrance; a valve member in the valve chamber having a seat portion adapted for engagement with said sealing member; and a valve actuating plunger mounted for endwise movement in said outlet passage.

4. A fire extinguisher discharge head comprising a body having a laterally extending handle, the body having a vertical through bore and being exteriorly threaded at its lower end for connection to a fluid medium container; said bore incorporating upper and lower counter-bore sections teminating at their lower ends in upper and lower upwardly facing shoulders, respectively; an apertured sealing member seated on the upper shoulder and having a central annular portion overlying the upper end of the lower counter-bore section; a plug member having threaded engagement with the upper counter-bore section and at its lower end seating on said sealing member; said plug member having a vertical through bore aligned with the sealing member aperture; a valve member in the lower counter-bore section having an upwardly directed seat portion adapted for engagement with the said annular portion of the sealing member; a spring in the lower counter-bore section extending between the underside of the valve member and the lower counter-bore shoulder; said plug member having an outlet bore extending laterally from its vertical bore and the head having an outlet communicating with the plug member outlet bore; a valve plunger reciprocable in the plug member bore, said plunger extending above the top of the plug member and being of less diameter than the plug member bore from its lower end to a point above the plug member outlet bore; and an actuator lever pivotally mounted on the head on the side remote from the handle and overlying the handle and the upper end of the valve plunger.

ALEXANDER E. WEAVER.
CECIL H. SMITH.

References Cited in the file of this patent

UNITED STATES PATENTS

| Number | Name | Date |
|---|---|---|
| 1,898,899 | Rowley | Feb. 21, 1933 |
| 2,500,214 | Stroop | Mar. 14, 1950 |
| 2,560,407 | Boal | July 10, 1951 |
| 2,562,963 | Stroop | Aug. 7, 1951 |